(No Model.) 2 Sheets—Sheet 1.

J. H. WHITNEY.
TREADLE.

No. 407,804. Patented July 30, 1889.

WITNESSES
W. H. Lowe
Edward S. Berrall

INVENTOR
James H. Whitney (No Model.) 2 Sheets—Sheet 2.

J. H. WHITNEY.
TREADLE.

No. 407,804. Patented July 30, 1889.

WITNESSES
Wm H Lowe
Edward S. Berrall

INVENTOR
James H Whitney

UNITED STATES PATENT OFFICE.

JAMES H. WHITNEY, OF BROOKLYN, NEW YORK.

TREADLE.

SPECIFICATION forming part of Letters Patent No. 407,804, dated July 30, 1889.

Application filed October 5, 1888. Serial No. 287,295. (No model.)

*To all whom it may concern:*

Be it known that I, JAMES H. WHITNEY, a citizen of the United States, residing at No. 181 Madison street, Brooklyn, in the county of Kings and State of New York, have invented a new and useful Improvement in Treadles, (for which I have obtained no foreign Letters Patent whatever,) of which the following is a specification.

The present invention is an improvement on that shown in my application, Serial No. 262,310, filed January 30, 1888, already allowed, but not yet issued.

The objects of this invention are to provide swivel-chambers for the suspending-springs; to make the treadles adjustable to the table-frames of different machines at will by varying the height of the treadle or foot-piece from the floor and the distance of the suspending-springs and spring-chambers from the sides of the frame; to give the foot-piece of the treadle a considerable amount of free horizontal movement at will and a vibratory or up-and-down movement at any and all points of that horizontal movement without disturbing its operative relations to the associated parts; to make the suspending-springs of the foot-piece automatically adjustable in the inclosing-chambers; to accommodate these various motions to the pitman and its necessary action by means of a ball-and-socket joint as a connection between the two, and also to provide means for relieving dead-centers in the driving wheel or pulley. I attain these objects by the mechanism illustrated in the accompanying drawings, in which—

Figure 1:
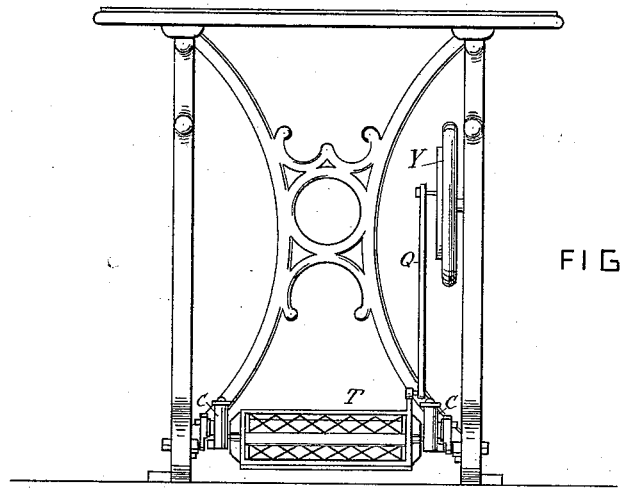
Figure 14:
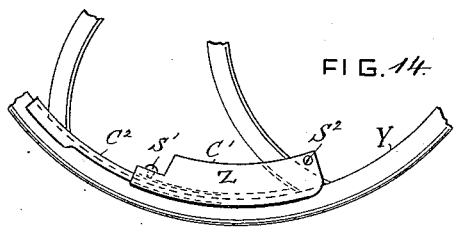
Figures 16, 17:
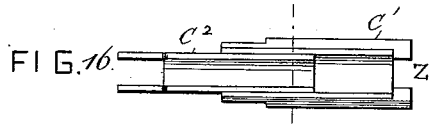
Figure 15:
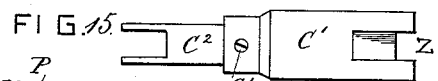
Figure 2:
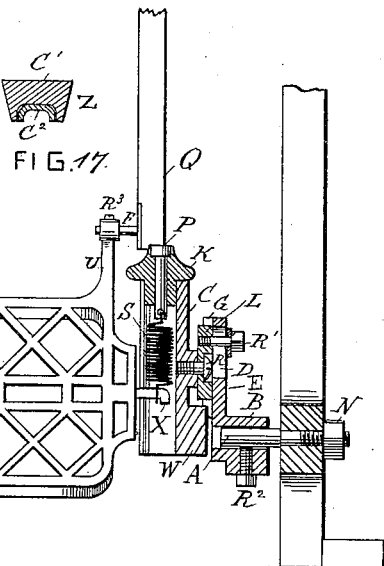
Figure 3:
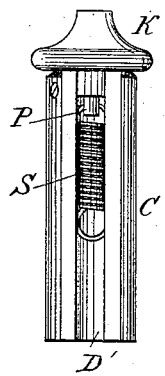
Figure 4:
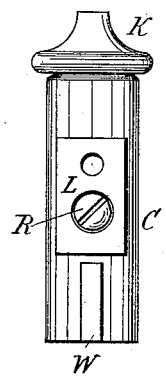
Figure 6:
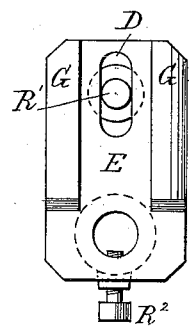
Figure 7:
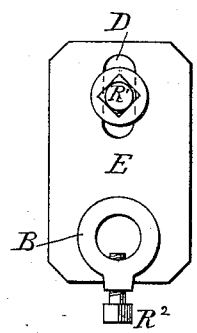
Figure 5:
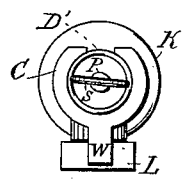
Figure 8:
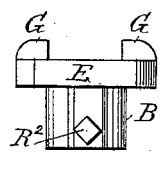
Figure 9:
Figure 10:
Figure 13:
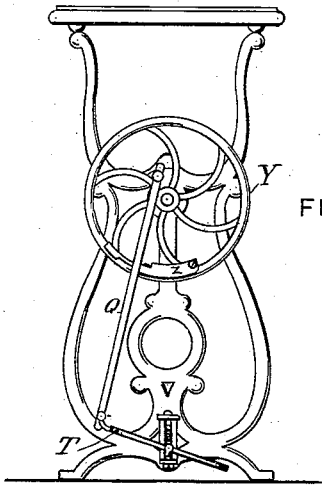
Figure 11:
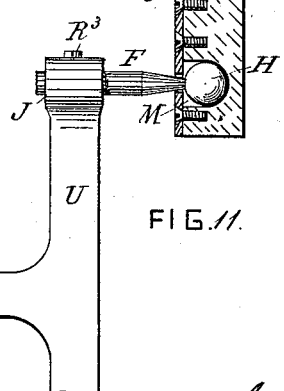
Figure 12:
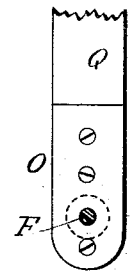

Figure 1 is a front view of the stand, having a treadle, a balance-wheel, and a pitman connecting the two. Fig. 2 is a part sectional and part perspective view of the treadle, the lower part of the frame, and their connections. Fig. 3 is a front view, Fig. 4 a back view, and Fig. 5 a bottom view, of the chamber and its immediate connections. Fig. 6 is one side view, Fig. 7 is another side view, and Fig. 8 is a bottom view, of an intermediate connection-plate between the chamber and the stand-frame. Fig. 9 is an end view, and Fig. 10 is a side view, of the adjustable screw-pin that makes the connection with the frame. Figs. 11 and 12 are views, in part sectional, of the ball-and-socket connections between the treadle and the pitman. Fig. 13 is a side view of a sewing-machine stand, counterbalanced driving-wheel, and treadle. Fig. 14 is an enlarged view of the counter-balance and part of the driving-wheel, with the counter-balance in position on the driving-wheel. Fig. 15 is an under or outside view of the improved counter-balance. Fig. 16 is a view of the opposite side of the same, and Fig. 17 is a sectional view of the same.

Similar letters refer to similar parts throughout the several views.

In my previous invention the chambers inclosing the suspending-springs were connected to the frame so as to be held rigidly in one fixed position, and the springs were secured by and to a pin passing through the top of the chamber and holding the upper end of the spring rigidly in one position, so as to be incapable of self-adjustment, whereas in my present invention the spring-chambers are swiveled and made movable or automatically adjustable on radial lines, either vertical or on one or both sides of the vertical, permitting the vibrations of the springs on any of these radial lines, and the springs are secured or suspended to a pin passing vertically through and held by the cap or cover of the chamber, the pin having free rotary motion and the cap being secured in position by a screw passing through the chamber into it.

C C are the swivel spring-chambers, each provided with a cap K, a swivel-pin P, to which the spring is secured, and a spring S. The back or outside of each swivel-chamber C has secured thereto a swivel-plate L, by means of a screw R loosely, so that the plate will turn freely on the screw, which is countersunk in the plate, as shown, to avoid contact with the connecting-plate. The upper part of the plate L is provided with and receives a binding-screw R', the threaded end of which is to be fixed in the plate L, being inserted therein through the slot D in the connecting-plate E, for the purpose of securing them rigidly together at any desired point or part of the slot. The plate L is made to fit easily between the gibs G of the connecting-plate E, and may be moved up and down therein and secured at any desired point by loosening and again tightening the screw R'. The lower end of the plate E is provided with the perforated extension or boss B, which receives the adjusting-pin A, and is secured thereto at any desired point by the screw R². The adjusting-pin A is shouldered and provided with a nut N, so as to be firmly fixed in the frame by screwing up the nut, and removed or made removable by unscrewing it. The pin F is provided at one end with the ball H, which is held in the socket M in the lower end of the pitman Q by the plate O, while the other end is made sufficiently long to be adjustable and capable of being secured in the eye J of the arm U of the treadle T by the screw R³. The centers of the treadle-rods of different sewing-machines, particularly, vary in different machines, both in their relations to the center, as of a perfectly-balanced treadle, and also in the distances from the floor. It is therefore necessary to make provision to meet these differences of distance in an apparatus intended to be applied to the different sewing-machine stands already in the market and in the hands of purchasers.

By means of the adjustable features heretofore mentioned I am able to attach the treadle and associated mechanism described to any machine, the pins A being arranged to be adjusted and secured in the holes already made in the frame to receive the ordinary treadle rod and brace, thereby placing the entire treadle mechanism in proper relations to the machine through the pitman.

In my previous invention the trunnions of the treadle have vertical motion in the vertical slots of the chamber. In some positions of the pitman in that case there will be a tendency to pull the trunnions against the sides of the slots, and in that way cause friction, and in other positions of the pitman the trunnions will be thrust against the opposite sides of the slots, thereby again causing friction and wasting power and strength. In both these instances the foot of the operator is or may be more or less frequently called upon to overcome this friction, thus increasing the fatigue of the operator when long continued.

In this invention the chambers C C are provided with such attachments, and so connected and secured, as to freely vibrate within certain limits to one or either side of a vertical line under a slight thrust or pull, thereby relieving the friction and the foot of the operator. Another result of this arrangement is that if the upper end of the pitman gets on a dead-center slight extra pressure of the foot of the operator thrusting forward the treadle and the lower end of the pitman causes the dead-center to be relieved, almost unconsciously to the operator, perhaps, but still greatly to her eventual benefit. It is further to be noticed that the drive-wheel, being provided with a weight or counter-balance Z, its momentum acquired by the running of the machine, will not only perform the duties of an ordinary counterbalanced wheel in that position, but will also, through the pitman on the treadle, take effect upon the vibrating or swivel chamber and its spring, and also on the foot, ankle, and limb of the operator, and this in such a way as to assist in moving the vibrating spring-chambers C C, one or both of them, into positions to relieve friction, and also relieve strain upon the operator at one and the same time.

Furthermore, where the counter-balance on the driving-wheel is used in connection with a fixed treadle-rod bearing, a considerable proportion of the momentum due thereto takes effect and first meets with rigid resistance at and upon the treadle-rod, which, being the fulcrum of the lever and located between the two other points of the lever, transmits the shock to the foot of the operator, as well as throughout the machine, and even to the floor; but in this invention the momentum takes effect readily and easily in any position of the spring and swivel chambers upon the springs themselves in such a way as to largely prevent shock or concussion to the foot of the operator and elsewhere, and a portion of this momentum is at each revolution taken up by the springs and therefrom transmitted either to and through the moving parts of the machine or to the foot of the operator in such a way as to relieve the latter and assist the operation of the machine. I do not, however, wish to limit my invention by requiring the use of the counter-balance, since the mechanism is effective without it; but I find by actual experiment that when the counter-balance is used a sewing-machine will make seventy-five or more stitches after the foot of the operator is removed, and that while the foot of the operator is upon the treadle the machine may be run with less tiresome effects.

The counter-balance is preferably so located upon the driving-wheel as to automatically throw the pitman off a dead-center, as shown in Fig. 13. I prefer the form and construction of counter-balance shown in Figs. 14, 15, 16, and 17, but do not desire to limit my invention in that part of it to a counter-balance of the construction shown. The counter-balance, as shown, consists of two parts C' and C², both preferably of lead, and the former has on the side adjacent to the inner side of the rim of the wheel a groove, preferably of a rounded form, approximately conforming to the shape of the inner side of the rim, but too large to fit the same. The part C² is of a shape and size to slide within the groove and between the part C' and the inner side of the rim as much or as little as may be necessary to permit the forks at one end of each part of the counter-balance to embrace adjacent arms of the driving-wheel, as shown in Figs. 13 and 14. So placed, with the two parts secured together by a screw S', these two adjacent arms become the supports of an arch formed by the junction of these two parts, and will prevent the counter-balance from either breaking down in the center or being otherwise displaced. One reason for making the counterbalance of lead is that being so made, particularly $C^2$, the screw $S'$, being pointed and passed through a hole in the part $C'$, prepared in advance, may be easily caused to penetrate the part $C^2$ at any point at which it may be brought in contact, when the opposite ends of the part are brought into complete contact and engagement with the two adjacent arms and the inside of the rim of the wheel between them. So, also, with the screw $S^2$. Passing through the hole prepared in one side of the part $C'$, it may be screwed into the other part readily without previous perforation of the same. Thus constructed, the counterbalance Z may be adjusted and attached to the driving-wheels of any size or kind ordinarily used by persons of only ordinary mechanical skill, and the lead parts will readily yield to slight force, so as to become molded to the adjacent parts of the wheel in the form of an arch of sufficient strength for its retention in place. The chambers C C are provided with slots $D'$ $D'$, in which the trunnions X X move with a reasonably close fit. As a convenient means of engaging the trunnions X X with the lower eye of the springs S S, I give the trunnions a slightly hooked form, or provide a shoulder, as shown, which will prevent the disengagement of the parts. Of course a variety of other methods and forms may be adopted for the same purpose. The stop-lug W on the lower part of the swivel-spring chamber C is so placed that it will limit the vibration of the chamber either by contact with the bottom edge of the swivel-plate L or with stops on the connecting-plate E at opposite sides—as, for instance, with the bottoms of the gibs G G—and will thus control within well-defined limits the direction of the vibrations of the springs S S.

In using the term "balanced treadle" I have not intended to indicate that the treadle to be a balanced treadle must be accurately poised or balanced on the trunnions and in the eyes of the springs, but only that the fulcrum is located, as in the third form of lever, between the power and the weight at any point desired.

I claim as my invention—

1. A balanced treadle suspended from spring-bearings suspended in swivel-chambers.

2. The balanced treadle T, suspended from and in combination with the springs S S, and the swivel-chambers C C.

3. The treadle T, suspended from the springs S S, and the slotted swivel-chambers C C, all in combination.

4. In combination, a balance-wheel, a pitman operating the same, a balanced treadle connected with the pitman through a ball-and-socket joint, substantially as shown and described, and suspended from spring-bearings held in swivel-chambers.

5. In combination, a balance-wheel provided with a counter-weight, a pitman operating the same, a balanced treadle connected with the pitman through a ball-and-socket joint, substantially as shown and described, and suspended from spring-bearings held in swivel-chambers.

6. A balanced treadle provided with trunnions X X, arranged to vibrate in the slots $D'$ $D'$ of the swivel-chambers C C, in combination with the springs S S.

7. In treadles, the combination of the following elements: the swiveled spring-chamber C, the swivel-plate L, and the connecting-plate E.

8. In treadles, the swivel-chamber C, the spring S, swivel-pin P, the cap K, and swivel-plate L.

9. In treadles, and in combination, the following elements: the spring-chamber C, having stop-lug W, and the swivel-plate L.

10. In treadles, the following elements in combination: the connecting-plate E, provided with the gibs G G, the slot D, and the adjustable pin A.

11. The connecting-plate E, provided with the slot D and the gibs G G, the adjusting-pin A, the swivel-chamber C, swivel-plate L, and the pins R and $R'$, all in combination.

12. The treadle T, suspended on each side in spring-bearings and provided with a ball-and-socket connection with the pitman, as shown and described, and in combination.

13. The drive-wheel Y, provided with a counter-balance or weight Z, and a treadle T, suspended in spring-bearings inclosed in swivel-chambers, substantially as shown and described.

14. The drive-wheel Y, provided with a counter-balance or weight Z, a treadle T, suspended in spring-bearings inclosed in swivel-chambers, and having the ball-and-socket connection between the treadle and the pitman, substantially as shown and described.

JAMES H. WHITNEY.

Witnesses:
JAMES A. SKILTON,
EDWARD S. BERRALL.